(12) United States Patent
Agboola et al.

(10) Patent No.: US 11,027,506 B1
(45) Date of Patent: Jun. 8, 2021

(54) ACTUATING RING FOR TIRE MOLD ASSEMBLY

(71) Applicant: The Goodyear Tire & Rubber Company, Akron, OH (US)

(72) Inventors: Babatunde Omogbolahan Agboola, Uniontown, OH (US); William Andrew Haydu, Copley, OH (US); Deep Samanta, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 16/899,615

(22) Filed: Jun. 12, 2020

(51) Int. Cl.
*B29D 30/06* (2006.01)
*B29C 33/00* (2006.01)

(52) U.S. Cl.
CPC ...... *B29D 30/0629* (2013.01); *B29C 33/0038* (2013.01); *B29D 2030/0618* (2013.01)

(58) Field of Classification Search
CPC .......................... B29D 30/0629; B29C 33/0038
See application file for complete search history.

(56) References Cited

U.S. PATENT DOCUMENTS

| | | | |
|---|---|---|---|
| 3,779,677 A * | 12/1973 | Greenwood | B29D 30/0629 425/46 |
| 3,910,735 A * | 10/1975 | Caretta | B29D 30/0605 425/46 |
| 3,990,906 A | 11/1976 | Johnston et al. | |
| 4,072,550 A | 2/1978 | Stalter, Jr. | |
| 4,105,486 A | 8/1978 | Cantarutti | |
| 4,601,160 A | 7/1986 | Heisler | |
| 4,689,106 A | 8/1987 | Becht et al. | |
| 4,741,683 A * | 5/1988 | Hilke | B29C 33/48 425/47 |
| 5,585,064 A * | 12/1996 | Moris-Herbeuval | B29C 33/0038 264/501 |
| 6,770,229 B2 | 8/2004 | Cole | |
| 6,808,376 B2 | 10/2004 | Serener-thielmann | |
| 6,841,102 B2 | 1/2005 | Cole | |
| 6,916,164 B2 | 7/2005 | Kasper et al. | |
| 7,056,109 B2 * | 6/2006 | Kata | B29D 30/0629 425/46 |
| 7,513,762 B2 | 4/2009 | Mcbride | |
| 7,524,175 B2 * | 4/2009 | Henrotte | B29C 33/10 425/28.1 |
| 7,963,756 B2 | 6/2011 | Bachochin | |
| 8,100,677 B2 * | 1/2012 | Scala | B29C 33/10 425/28.1 |

* cited by examiner

*Primary Examiner* — James P Mackey
(74) *Attorney, Agent, or Firm* — Robert N. Lipcsik

(57) ABSTRACT

An actuating ring for a tire mold includes an upper sidewall portion and a lower sidewall portion providing radial and axial movement of the actuating ring relative to the upper sidewall portion and the lower sidewall portion. The actuating ring has axially upper, circumferentially extending slots and axially lower, circumferentially extending slots axially offset from the axially upper, circumferentially extending slots.

7 Claims, 8 Drawing Sheets

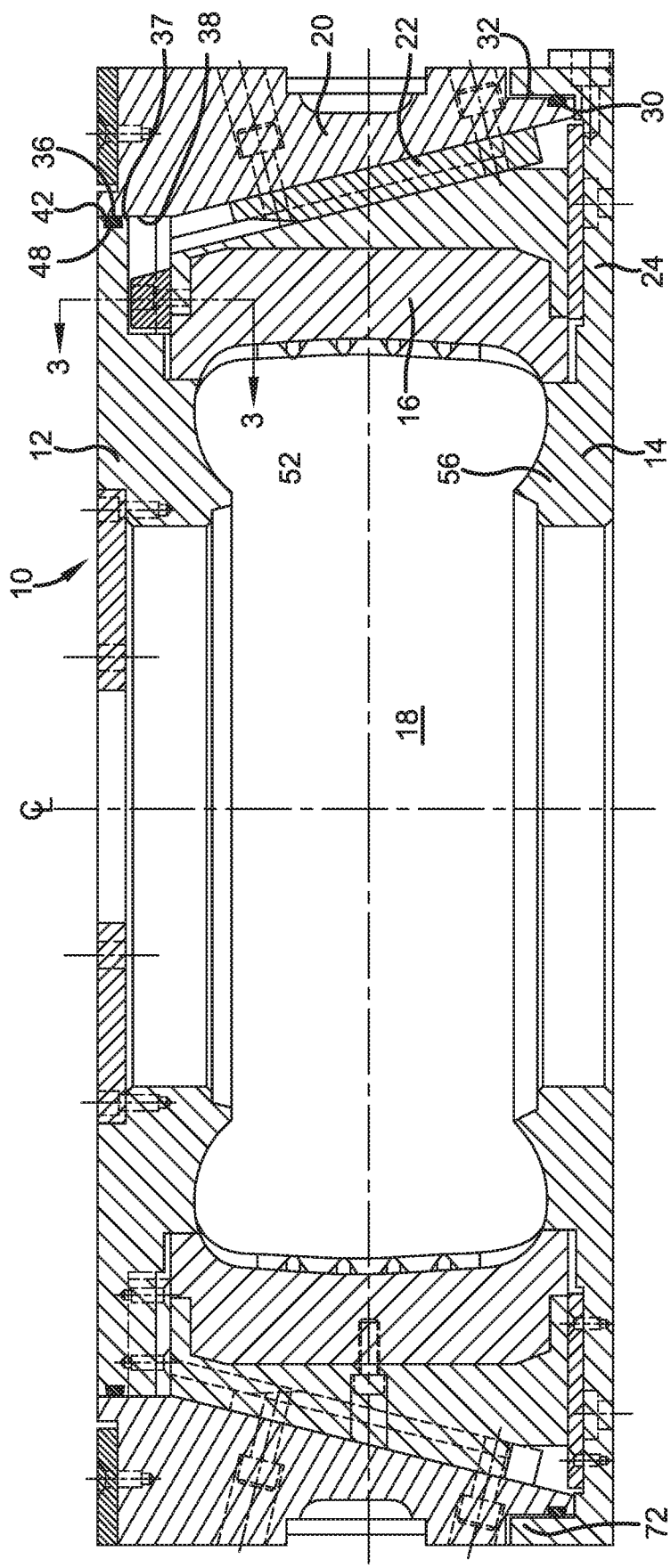
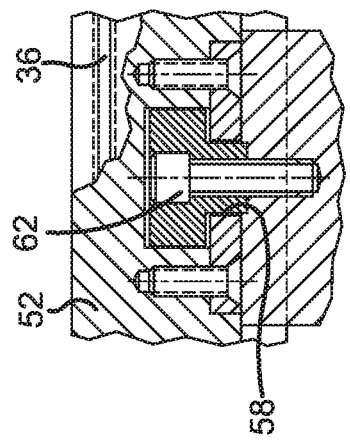
FIG. 2
FIG. 3

ACTUATING RING FOR TIRE MOLD ASSEMBLY

FIELD OF THE INVENTION

This present invention relates to molds for curing/producing tires and, more particularly, to a actuating ring for a tire mold assembly.

BACKGROUND OF THE INVENTION

Tires have long been manufactured by vulcanization within a tire mold. For example, a conventional two-piece tire mold may include various seals and pressurized compartments. Another conventional two-piece tire mold may utilize a vacuum. Still another conventional tire mold may be a segmented tire mold.

Typical tire molds may have small holes or vents to allow air trapped within the mold to escape. When a tire is vulcanized/cured and removed from the mold, rubber that has been vulcanized within the vents in the mold may extend outwardly from the surface of the tire in the form of burrs or extensions. These burrs may detract from the tire's appearance and may be shaved from the tire as a final finishing step in a tire manufacturing process. These extension burrs are a waste of rubber create an undesirable source of scrap material which must be collected and properly disposed of. Further, removal of the burrs may require an extra step in the tire manufacturing process, thus raising the cost and complexity of manufacturing the tire due to the extra space, labor, and/or equipment required. As a result, conventional ventless tire molds have become most used. Reducing the weight of such tire mold assemblies may further reduce cost.

SUMMARY OF THE INVENTION

An actuating ring assembly for a tire mold, in accordance with the present invention, includes a radially moveable tread mold portion operable with an upper sidewall portion and a lower sidewall portion to define a tire mold cavity in a closed position of the tire mold; and an actuating ring slidably engaging the upper sidewall portion and the lower sidewall portion to provide radial and axial movement of the actuating ring relative to the upper sidewall portion and the lower sidewall portion. The actuating ring has axially upper slots and axially lower slots axially offset from the axially upper slots.

According to another aspect of the actuating ring assembly, the upper sidewall portion has a radially outer cylindrical surface and the actuating ring has a radially inner cylindrical surface in alignment with the outer cylindrical surface of the upper sidewall portion; and a sealing means is disposed between the outer cylindrical surface of the upper sidewall portion and the inner cylindrical surface of the actuating ring.

According to still another aspect of the actuating ring assembly, a sealing means includes a sealing member disposed in a circumferential groove in the outer cylindrical surface of the upper sidewall portion for sealing engagement with the inner cylindrical surface of the actuating ring during closing of the tire mold.

According to yet another aspect of the actuating ring assembly, the tire mold is connected to the upper sidewall portion by support means permitting radial movement of the tire mold in response to vertical movement of the actuating ring relative to the tire mold; and the support means being covered to maintain the integrity of a location for application of a vacuum.

According to still another aspect of the actuating ring assembly, a support means comprises pocket type slots closed at the upper sidewall portion and retainer tee members on the tire mold for sliding engagement in the pocket type slots.

According to yet another aspect of the actuating ring assembly, a support means comprises pocket type slots open at the upper sidewall portion, retainer tee members on the tire mold for sliding engagement in the pocket type slots, and cover members fastened to the tire mold over the pocket type slots.

According to still another aspect of the actuating ring assembly, pocket type slots include supporting plate members fastened to a lower face of the upper sidewall portion under the pocket type slots.

According to yet another aspect of the actuating ring assembly, supporting plate members are fastened to the upper sidewall portion by screws.

According to still another aspect of the actuating ring assembly, a sealing means comprises a bladder ring having a radially inner edge fastened to the upper sidewall portion and a radially outer edge fastened to the actuating ring.

According to yet another aspect of the actuating ring assembly, a bladder ring is disposed under a circular shield fastened to the upper sidewall portion to protect the bladder ring.

According to still another aspect of the actuating ring assembly, the upper sidewall portion comprises an integral upper sidewall mold member and an O-ring on the upper sidewall portion.

An actuating ring for a tire mold, in accordance with the present invention, includes an upper sidewall portion and a lower sidewall portion providing radial and axial movement of the actuating ring relative to the upper sidewall portion and the lower sidewall portion. The actuating ring has axially upper, circumferentially extending slots and axially lower, circumferentially extending slots axially offset from the axially upper, circumferentially extending slots.

BRIEF DESCRIPTION OF THE DRAWINGS

The present invention will be described below, by way of example with, and with reference to, the accompanying drawings, in which:

FIG. 2 is a schematic cross-sectional view of one half of a ventless segmented tire mold for use with the present invention;

FIG. 3 is a is a schematic cross-sectional view taken along line 3-3 of FIG. 2, illustrating one of the retainer tees;

DETAILED DESCRIPTION OF THE PRESENT INVENTION

Figure 1:
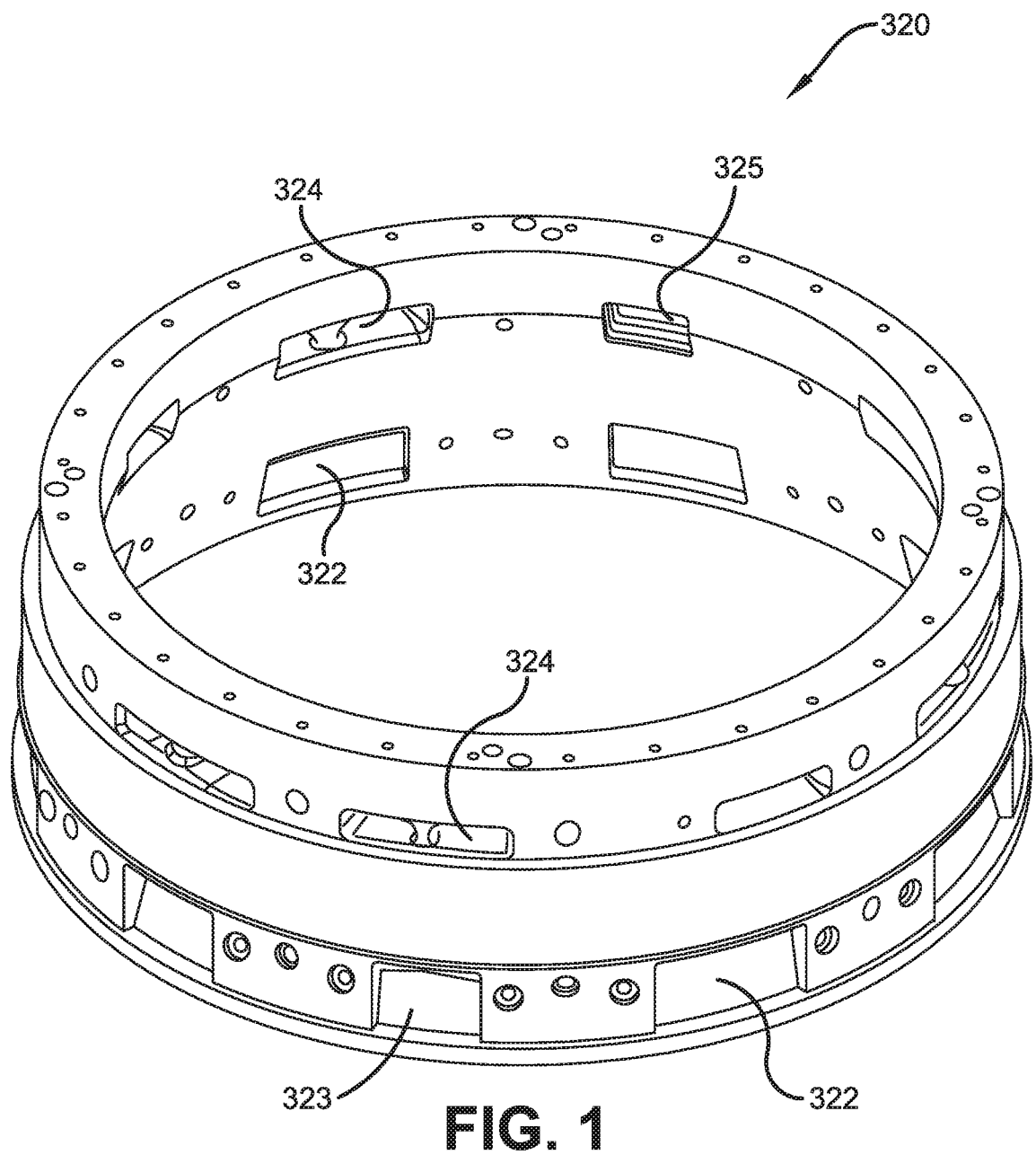
FIG. 1 is a schematic perspective view of an actuating ring in accordance with the present invention.
Figure 4:
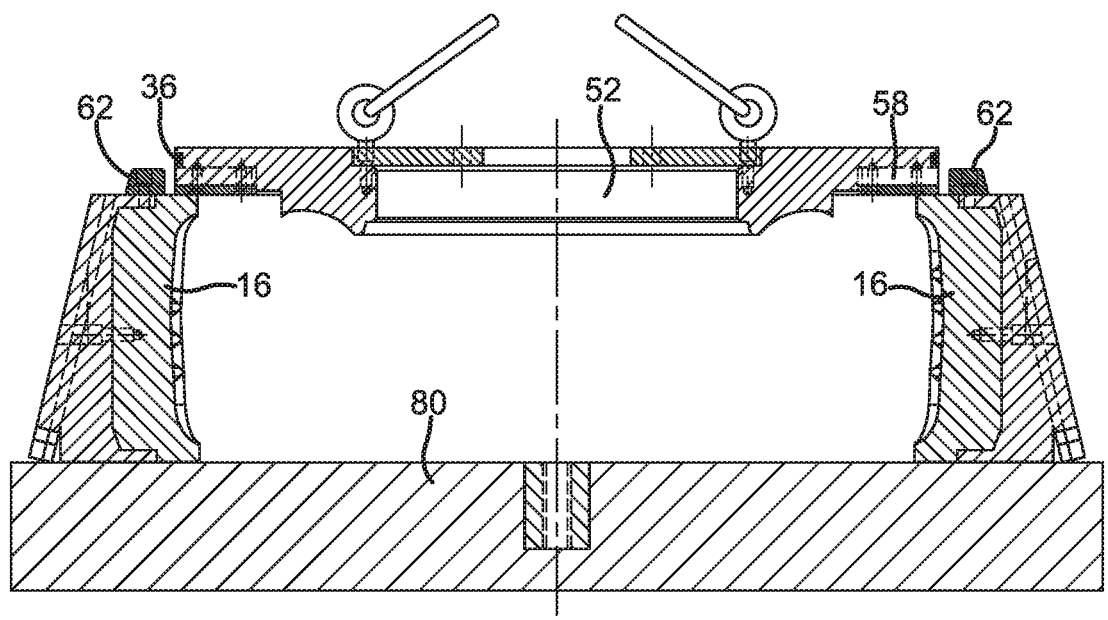
FIG. 4 a schematic cross-sectional view illustrating a first step in a method of installing a tire mold for use with the present invention.

Referring now to FIGS. 2-12 where the showings are for purposes of illustrating an assembly for use with the present invention only, and not for purposes of limiting the same. FIG. 2 is a cross-sectional view of a segmented tire mold 10 for use with the present invention. Primary elements of the mold 10 may include an upper sidewall mold assembly 12 and a lower sidewall mold assembly 14. The upper sidewall mold assembly 12 may include an upper sidewall mold plate 52. The lower sidewall assembly 14 may include a lower sidewall mold plate 56. The mold 10 may further include tread mold segments 16. A plurality of tread mold segments 16 may be moveable radially to assemble or disassemble the segmented tire mold 10 about the unvulcanized green tire. The operation of segmented tire molds is well-known in the art and will not be discussed further here.

The upper sidewall mold assembly 12 may include two members, an upper sidewall mold plate 52 and an O-ring 36. The upper sidewall mold plate 52 may be one piece and thereby impervious to air. Therefore, when coupled with the O-ring 36, the upper sidewall mold plate 52 may provide an air barrier when a vacuum is drawn on the tire mold cavity 18. The upper and lower sidewall mold assemblies 12, 14 and tread mold segments 16 together may define the tire mold cavity 18 within the tire mold 10. The tread mold segments 16 may be radially moveable, inwardly or outwardly, along a sloped slide 22 in response to vertical movement by a conical actuating ring 20. The actuating ring 20 may be axially moveable relative to a tire within the tire mold 10, or vertically with reference to FIG. 2.

With continuing reference to FIG. 2, a first sealing means may seal a gap between the actuating ring 20 and a lower mold member 24. The first sealing means may include another O-ring 30 and an abutting bronze cylindrical surface 32 on the actuating ring 20. The abutting bronze cylindrical surface 32 may be fixed to the actuating ring 20 and abut the lower mold member 14.

A second sealing means may seal a gap between the actuating ring 20 and the upper sidewall mold plate 52. The second sealing means may include the O-ring 36, which radially abuts an inner cylindrical surface 38. The upper sidewall mold plate 52 may have a radially outer cylindrical surface 42 aligned with the radially inner cylindrical surface 38 of the actuating ring 20. The inner cylindrical surface 38 may be bronze or other suitable bearing material. The O-ring 36 may be disposed in a circumferential groove 48 in the outer cylindrical surface 42 of the upper sidewall mold plate 52 and may seal with the inner cylindrical surface 38 of the actuating member 20 when the tire mold 10 is closed.

With reference to FIGS. 2-3, the tread mold segments 16 may be connected to the upper sidewall mold member 52 by pocket type slots 58, which are closed at the top in the upper sidewall mold plate 52 and retainer tee members 62 on the tread mold segments 16 for sliding engagement in the pocket type slots. With reference to FIGS. 4-7, the tread mold segments 16 may be assembled into slide blocks and arranged on a table 80. The table 80 may have a lubricated surface so that the segments 16 may be easily arranged in their appropriate positions. The retainer tee members 62 may be inserted into the pocket type slots 58. The O-ring 36 may be inserted into the circumferential groove 48 in the upper sidewall mold plate 52. The upper sidewall mold plate 52 may be suspended in a raised position while the tread mold segments 16 and retainer tee members 62 are slid in place.

Figure 5:
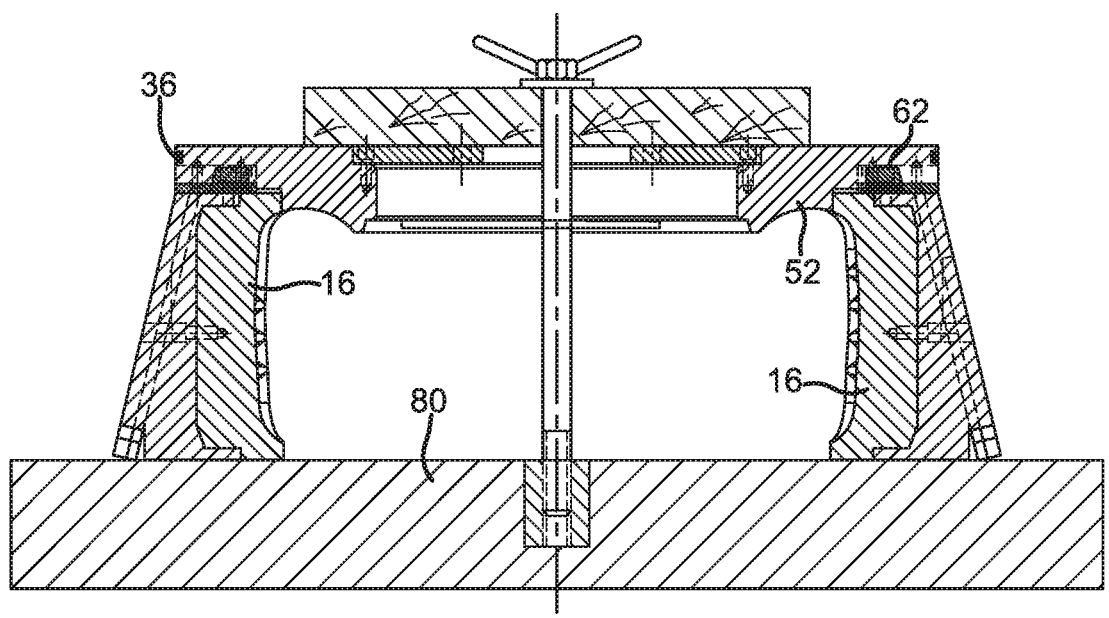
FIG. 5 a schematic cross-sectional view illustrating a second step in a method of installing a tire mold for use with the present invention.
Figure 6:
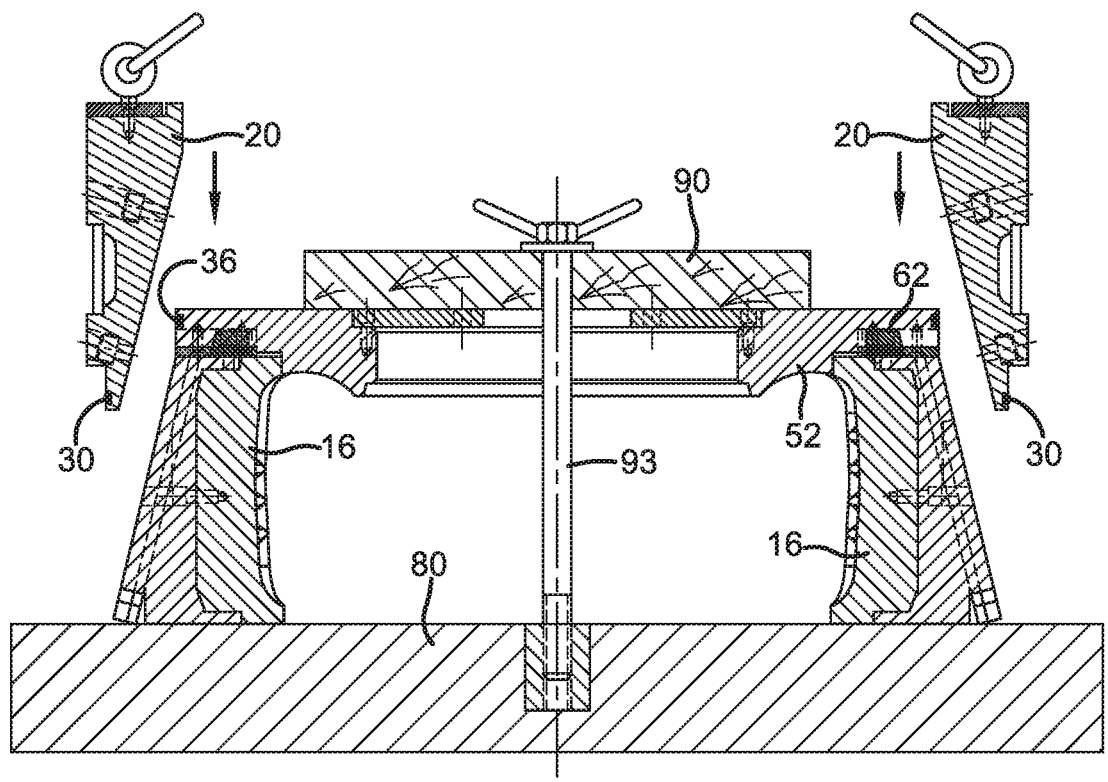
FIG. 6 a schematic cross-sectional view illustrating a third step in a method of installing a tire mold for use with the present invention.

With reference to FIG. 5, when all the tread mold segments 16 are in proper position in a tread segment and the upper sidewall mold plate 52, the upper sidewall mold plate 52 may clamp on to the table 80 with a wooden clamp bar 90 by a clamping rod 93. In some applications, clamping may not be necessary if the weight of the parts sufficiently keeps them in place. The actuating ring 20 may be fitted with the O-ring 30 and lowered over the upper sidewall mold plate 52. Stop bolts 94 (FIG. 7) may then be installed. The wooden clamp 90 on the upper sidewall mold plate 52 may be removed by removing the clamping rod 93.

Figure 7:
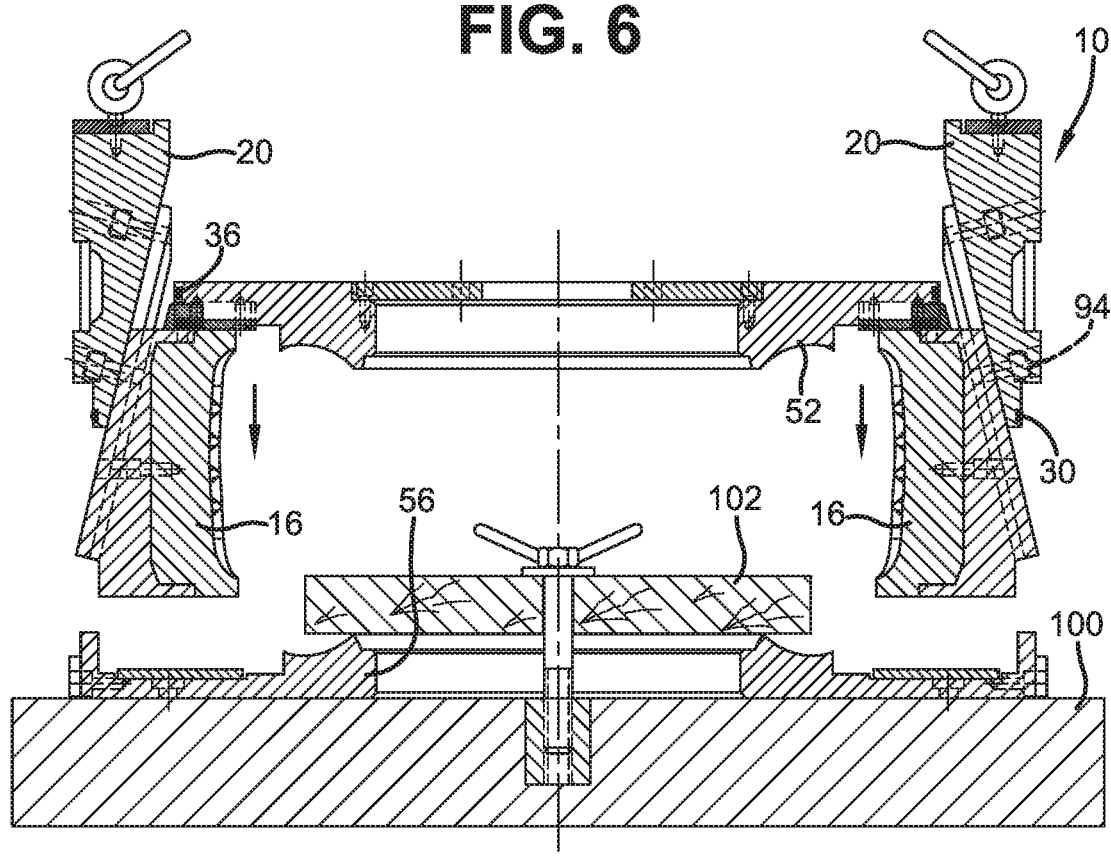
FIG. 7 a schematic cross-sectional view illustrating a fourth step in a method of installing a tire mold for use with the present invention.
Figure 8:
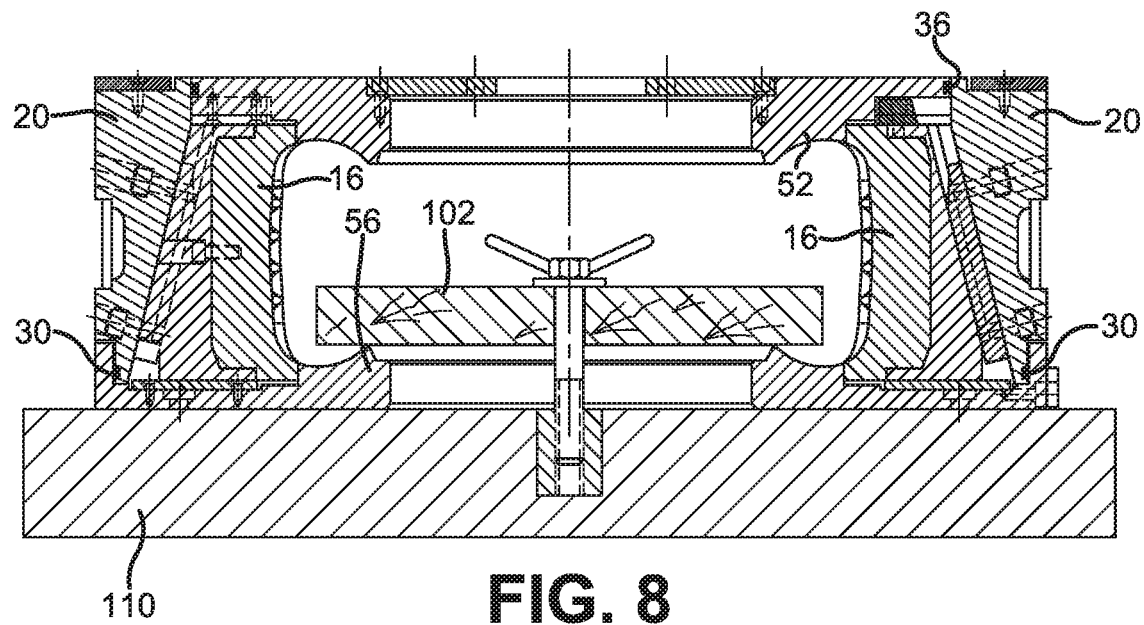
FIG. 8 is a cross-sectional view of part of a method of dissembling a tire mold for use with the present invention.

With reference to FIG. 7, the upper sidewall mold plate 52 and the actuating ring 20 may now be positioned over the lower sidewall mold plate 56, which has been previously secured to a separate table 100 and clamped with another wooden clamp 102. The suspended upper sidewall mold plate 52 and actuating ring 20 may be lowered onto the lower sidewall mold plate 56 so that the tire mold 10 is fully closed. At this time, shipping straps may be installed and the tire mold 10 may be moved and installed in a tire curing press (not shown). As part of a procedure for mounting the tire mold 10 into a tire curing press, the tire mold 10 may be set in position in the press. Two temporary hold-down clamps may be installed in platen slots 180 degrees from each other. The tire mold 10 may then be bolted to the top of the press. After the tire mold 10 is opened, a sealant or seal, such as a gasket, may be applied to shoulders of the bolts for sealing. Next, the bolts may be threaded through the lower sidewall mold plate 56 into the press platen. The temporary clamps 94 and 102 may then be removed.

The above procedure may enable the tire mold 10 to be installed into a tire press with O-rings 30, 36 in place. The O-rings 30, 36 may be lubricated with an appropriate lubricant when installed and when the tire mold 10 is cleaned. At every cleaning cycle, the O-rings 30, 36 may be inspected for excessive wear or fraying and may be replaced when worn or damaged. With reference to FIGS. 8-12, disassembly of the tire mold 10 may be achieved by removing the mold 10 from the press and set on a table 110 and shipping straps (not shown). The lower sidewall mold plate 56 may be clamped to a table 110 with a wooden clamp bar 102.

Figure 9:
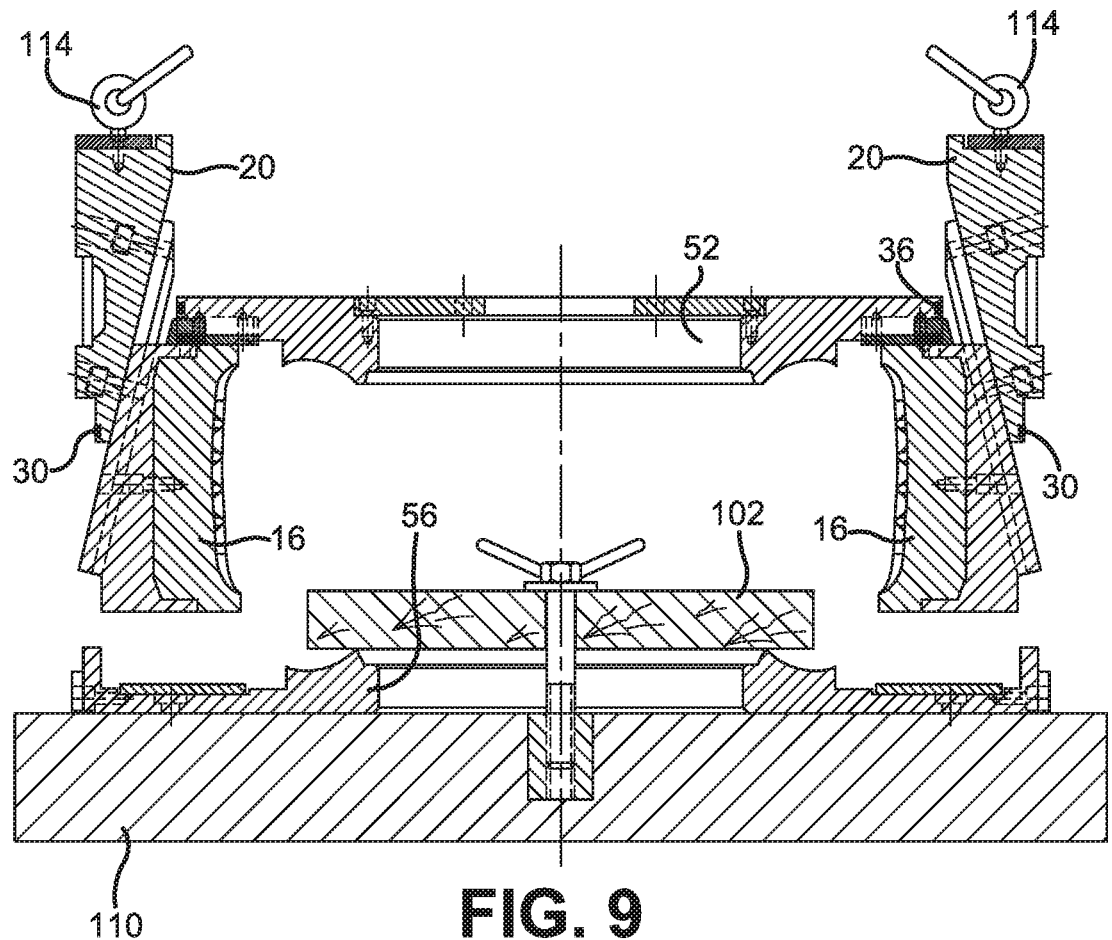
FIG. 9 is a cross-sectional view of another part of the method of dissembling a tire mold of FIG. 8.
Figure 10:
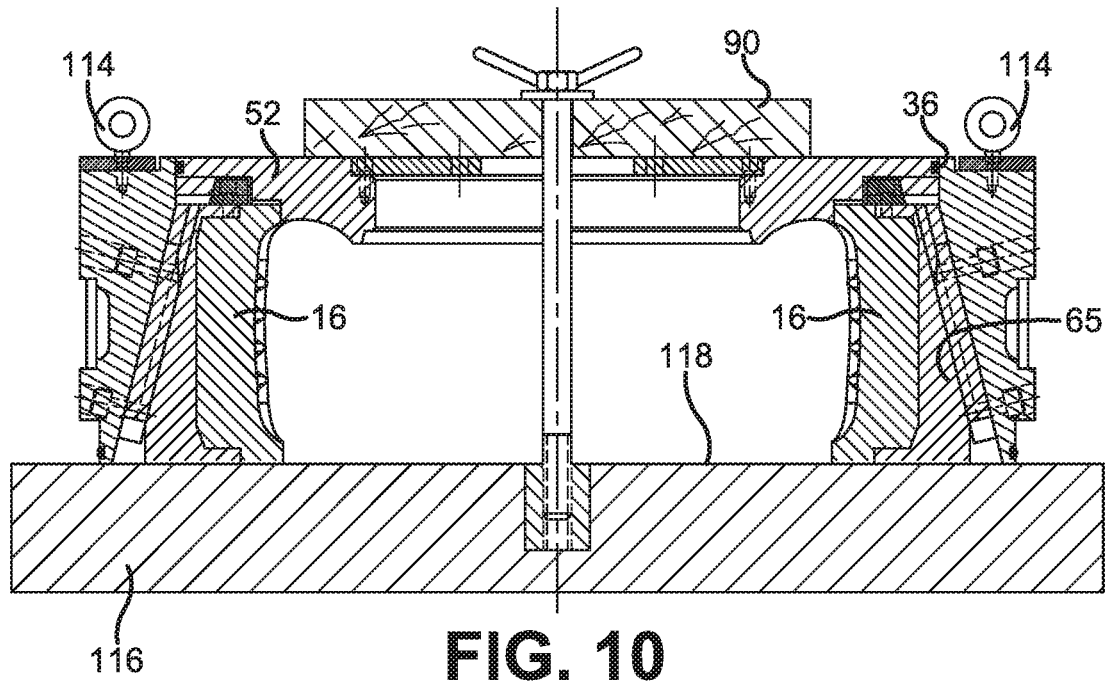
FIG. 10 is a cross-sectional view of another part of the method of dissembling a tire mold of FIGS. 8-9.
Figure 11:
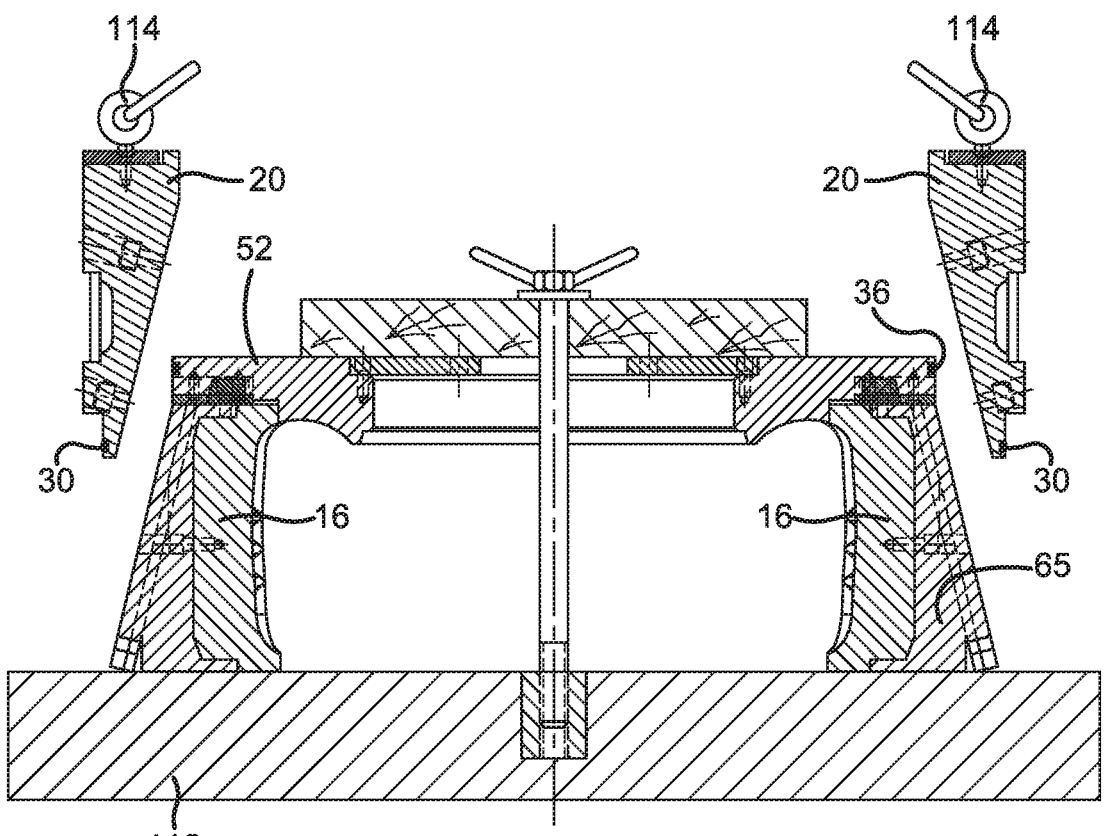
FIG. 11 is a cross-sectional view of still another part of the method of dissembling a tire mold of FIGS. 8-10.
Figure 12:
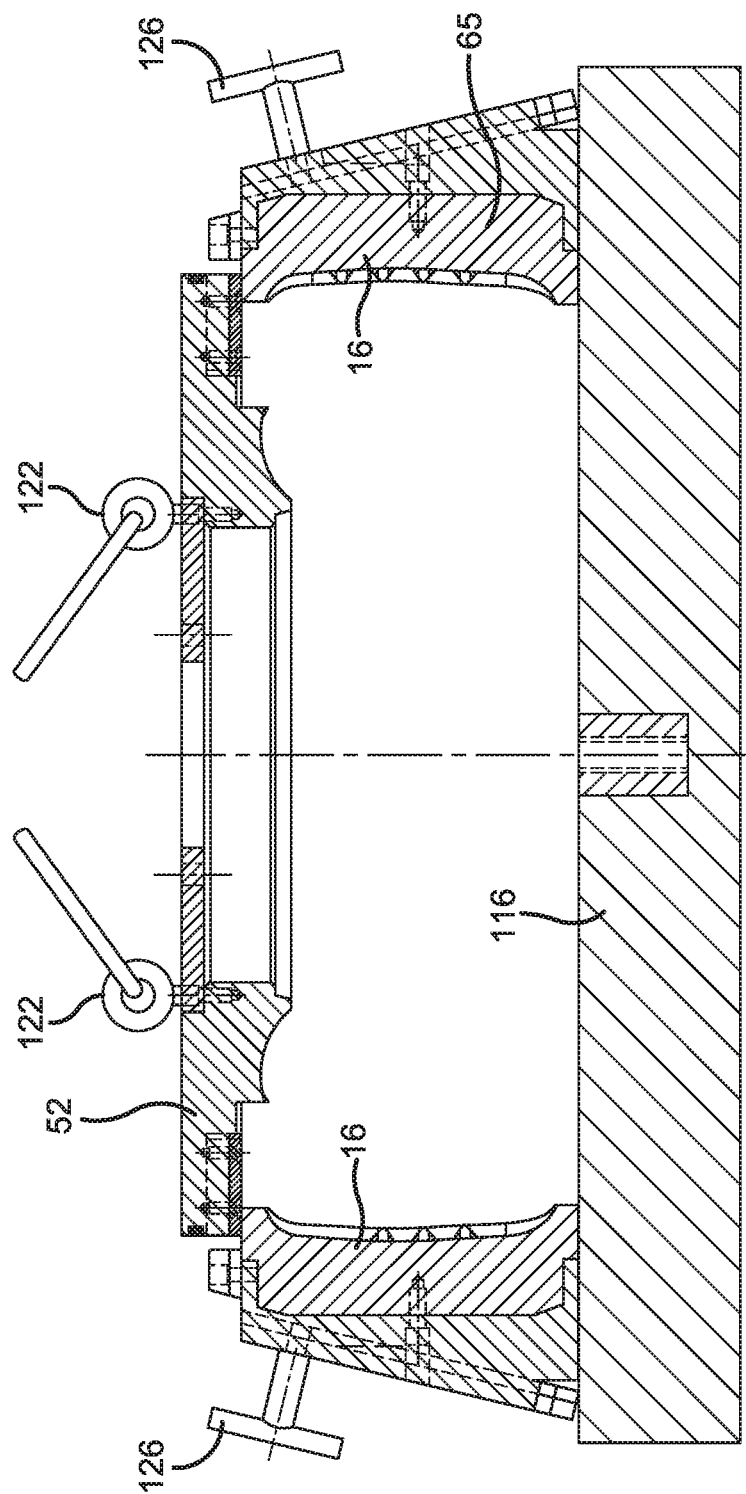
FIG. 12 is a cross-sectional view of yet another part of the method of dissembling a tire mold of FIGS. 8-11.
Figure 13:
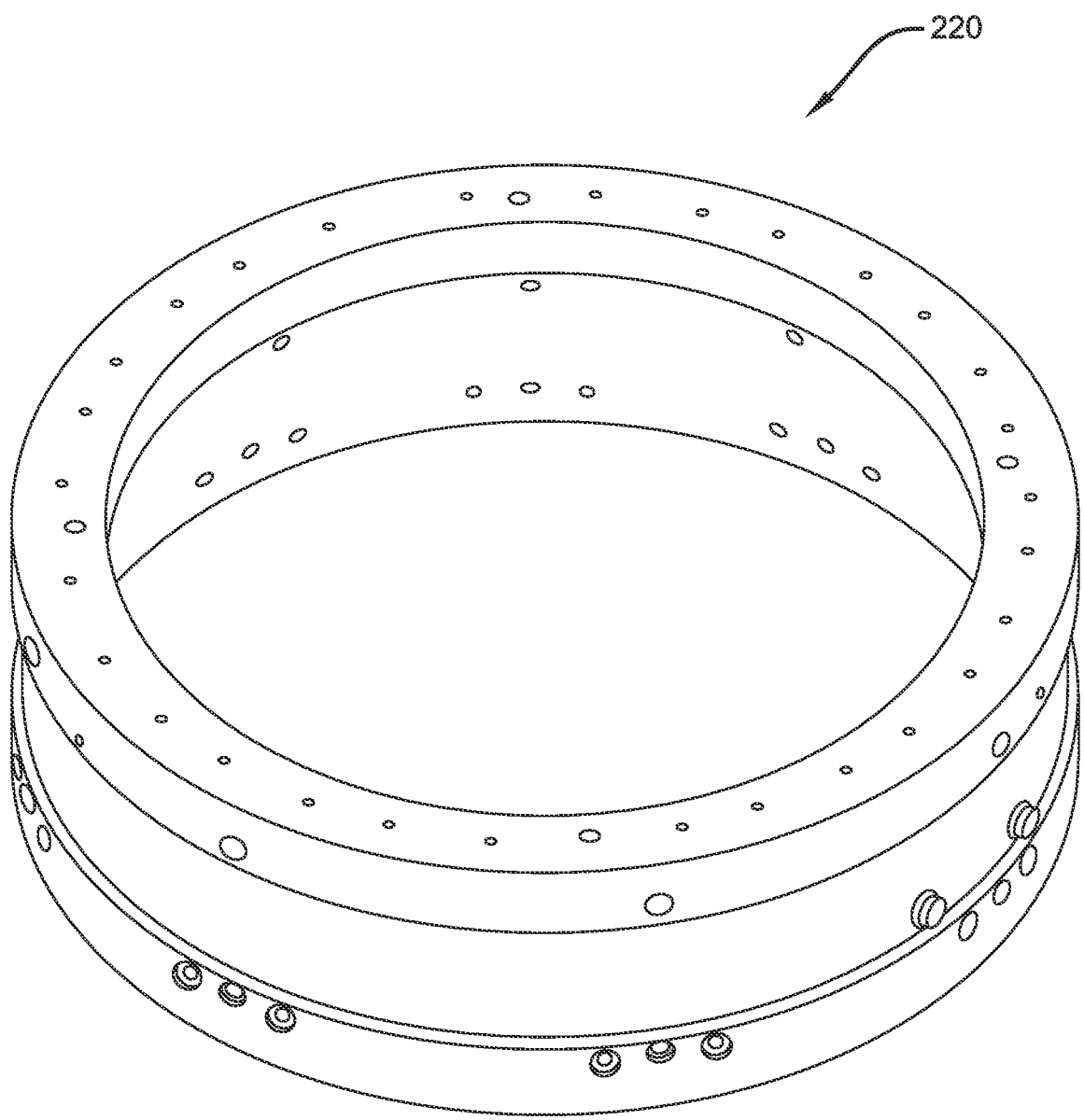
FIG. 13 is a schematic perspective view of a conventional actuating ring.

With reference to FIGS. 9-10, eye bolts 114 may be installed in the actuating ring 20 to lift the balance of the assembly and place it on another table 116 with a lubricated surface 118. Next, the upper sidewall mold plate 52 may be clamped to the table 116 with the wooden clamp bar 90. The stop bolts 94 may be removed. With reference to FIG. 11, the actuating ring 20 may be lifted via the eye bolts 114. With reference to FIGS. 11-12, the wooden clamp bar 90 may now be removed from the upper sidewall mold plate 52. Other eye bolts 122 may be installed in the upper sidewall mold plate 52. The upper sidewall mold plate 52 may thus be suspended to release weight from the slide blocks 65. If necessary for disassembly, tee handles 126 may be screwed into retraction tee holes in the slide blocks 65 and may be used to pull the side blocks radially outwardly so that the retainer tee members 62 clear the pocket type slots 58 in the upper sidewall mold plate 52. The tire mold 10 may now be ready for cleaning or lubricating. FIG. 13 shows another example of a conventional actuating ring 220, similar to the actuating ring 20.

FIG. 1 shows another example actuating 320 in accordance with the present invention. This actuating ring 320 includes axially upper slots 322, 323 and axially lower slots 324, 325 axially offset from the axially upper slots. The upper slots include first upper slots 322 and second upper slots 323 circumferentially shorter than the first upper slots. The lower slots include first lower slots 324 and second lower slots 325 circumferentially shorter than the first lower slots. These slots 322, 323, 324, 325 advantageously lowers the weight of the actuating ring 320 while maintaining appropriate structural and thermal strength characteristics.

Variations in the present invention are possible in light of the description of it provided herein. While certain representative examples and details have been shown for the purpose of illustrating the present invention, it will be apparent to those skilled in this art that various changes and modifications may be made therein without departing from the scope of the present invention. It is, therefore, to be understood that changes may be made in the particular examples described which may be within the full intended scope of the present invention as defined by the following appended claims.

What is claimed:

1. An actuating ring assembly for a tire mold comprising:
   a radially moveable tread mold portion operable with an upper sidewall portion and a lower sidewall portion to define a tire mold cavity in a closed position of the tire mold; and
   an actuating ring slidably engaging the upper sidewall portion and the lower sidewall portion to provide radial and axial movement of the tread mold portion relative to the upper sidewall portion and the lower sidewall portion, the actuating ring having axially upper rectangular circumferential slots and axially lower rectangular circumferential slots axially offset from the axially upper slots, one of the axially upper slots being circumferentially longer than another of the axially upper slots, one of the axially lower slots being circumferentially longer than another of the axially lower slots.

2. The actuating ring assembly as set forth in claim 1 wherein the upper sidewall portion has a radially outer cylindrical surface and the actuating ring has a radially inner cylindrical surface in alignment with the outer cylindrical surface of the upper sidewall portion; and a sealing means is disposed between the outer cylindrical surface of the upper sidewall portion and the inner cylindrical surface of the actuating ring.

3. The actuating ring assembly as set forth in claim 1 wherein the tire mold is connected to the upper sidewall portion by support means permitting radial movement of the tire mold in response to vertical movement of the actuating ring relative to the tire mold; and the support means being covered to provide an air barrier for application of a vacuum.

4. The actuating ring assembly as set forth in claim 1 wherein the support means comprises pocket slots closed at the upper sidewall portion and retainer tee members on the tire mold for sliding engagement in the pocket slots.

5. The actuating ring assembly as set forth in claim 4 wherein the pocket slots include supporting plate members fastened to a lower face of the upper sidewall portion under the pocket slots.

6. The actuating ring assembly as set forth in claim 5 wherein the supporting plate members are fastened to the upper sidewall portion by screws.

7. The actuating ring assembly as set forth in claim 1 wherein the upper sidewall portion comprises an integral upper sidewall mold member and an O-ring on the upper sidewall portion for engagement with the actuating ring.

\* \* \* \* \*